(12) United States Patent
Pearlman et al.

(10) Patent No.: US 7,839,840 B2
(45) Date of Patent: Nov. 23, 2010

(54) METHOD AND SYSTEM FOR ROUTING TRAFFIC IN A COMMUNICATION NETWORK

(75) Inventors: Marc Robert Pearlman, Clifton Park, NY (US); Scott Charles Evans, Burnt Hills, NY (US); Michael James Hartman, Clifton Park, NY (US); Asavari Rothe, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1133 days.

(21) Appl. No.: 11/442,159

(22) Filed: May 30, 2006

(65) Prior Publication Data

US 2007/0280197 A1    Dec. 6, 2007

(51) Int. Cl.
*H04L 12/28* (2006.01)
*G06F 15/173* (2006.01)

(52) U.S. Cl. .............. 370/351; 370/256; 370/331; 370/401; 370/402; 370/412; 709/203; 709/209; 709/226; 709/238; 709/248

(58) Field of Classification Search ......... 370/238–503; 709/201–248
See application file for complete search history.

(56) References Cited

U.S. PATENT DOCUMENTS

| | | | | |
|---|---|---|---|---|
| 5,307,484 | A * | 4/1994 | Baker et al. ............... | 707/102 |
| 5,854,896 | A * | 12/1998 | Brenner et al. ............ | 709/221 |
| 6,092,096 | A * | 7/2000 | Lewis ....................... | 709/200 |
| 6,216,173 | B1 * | 4/2001 | Jones et al. ............... | 715/705 |
| 6,363,411 | B1 * | 3/2002 | Dugan et al. .............. | 709/202 |
| 6,701,361 | B1 * | 3/2004 | Meier ........................ | 709/224 |
| 6,779,030 | B1 * | 8/2004 | Dugan et al. .............. | 709/223 |
| 6,857,012 | B2 * | 2/2005 | Sim et al. .................. | 709/222 |
| 6,918,014 | B1 * | 7/2005 | Borrill ...................... | 711/147 |
| 6,954,790 | B2 * | 10/2005 | Forslow .................... | 709/227 |
| 7,010,617 | B2 * | 3/2006 | Kampe et al. ............. | 709/248 |
| 7,020,695 | B1 * | 3/2006 | Kundu et al. .............. | 709/223 |
| 7,028,183 | B2 * | 4/2006 | Simon et al. .............. | 713/168 |
| 7,171,474 | B2 * | 1/2007 | Shanthaveeraiah et al. .. | 709/227 |
| 7,362,731 | B2 * | 4/2008 | Vinayakray-Jani ......... | 370/331 |
| 7,487,541 | B2 * | 2/2009 | Robert ...................... | 726/22 |
| 7,533,141 | B2 * | 5/2009 | Nadgir et al. ............. | 709/200 |
| 7,546,284 | B1 * | 6/2009 | Martinez et al. ........... | 707/2 |
| 7,702,725 | B2 * | 4/2010 | Erickson et al. ........... | 709/203 |

(Continued)

FOREIGN PATENT DOCUMENTS

WO       WO 0184338 A2 * 11/2001

*Primary Examiner*—Ayaz R Sheikh
*Assistant Examiner*—Venkatesh Haliyur
(74) *Attorney, Agent, or Firm*—Stephen T. Neal; Prass LLP

(57) ABSTRACT

A method and system for routing traffic in a communication network is disclosed that may include assigning each node in a network a first subset of route repository nodes and a second subset of route repository nodes, querying the second subset of route repository nodes in order to obtain route information that is stored in the second subset of route repository nodes, computing route information by applying a route computation algorithm to the first subset of route repository nodes, and routing traffic in the communication network based on the route information obtained from the second subset of route repository nodes and the route information computed using the first subset of route repository nodes.

15 Claims, 9 Drawing Sheets

U.S. PATENT DOCUMENTS

| | | | |
|---|---|---|---|
| 2002/0016860 A1* | 2/2002 | Garcia-Luna-Aceves et al. | 709/245 |
| 2002/0152262 A1* | 10/2002 | Arkin et al. | 709/202 |
| 2003/0093691 A1* | 5/2003 | Simon et al. | 713/201 |
| 2003/0160609 A9* | 8/2003 | Snowberg et al. | 324/300 |
| 2004/0010616 A1* | 1/2004 | McCanne | 709/238 |
| 2006/0182034 A1* | 8/2006 | Klinker et al. | 370/238 |
| 2006/0187017 A1* | 8/2006 | Kulesz et al. | 340/506 |
| 2007/0147620 A1* | 6/2007 | Zheng et al. | 380/277 |

* cited by examiner

210

Providing a network of nodes and links

220

Designating routing protocol messaging links

230

Transmitting and receiving routing information

US 7,839,840 B2

METHOD AND SYSTEM FOR ROUTING TRAFFIC IN A COMMUNICATION NETWORK

BACKGROUND OF THE INVENTION

Link state routing is widely used to send and receive information packets from node to node in an electronic network. In link state routing, every node receives a map of the entire network topology. Thus, every node knows the configuration and location of every other node in the network. However, with the advent of mobile wireless and ad-hoc networks and their continuously varying and dynamic topology of nodes, significant difficulties arise when routing information packets. The continuous changes in load, bandwidth, network configuration and types of information being sent, requires more and more network resources to update this information, resulting in an unacceptable increase in overhead to the network.

There have been some attempts to improve routing protocol messaging including optimized link state routing ("OLSR"), in which a special subset of nodes and links may be used to relay routing information advertisements.

However, none of these methods effectively reduce network overhead in a dynamic topology. Thus, there remains a need for a method of reducing the overhead related to managing and updating changes in the network. In addition, current routing systems do not consolidate routing information, resulting in inefficient route selection computations based on narrow views of the system. Thus, there remains a need to consolidate routing information to enable more centralized route computation based on a wider view of the system. There is also a need for flexible and dynamic configuration for a routing method that enables the system to adapt to the changing network behavior. There also exists a need for a routing system that offers quality of service routing and route reservation support in order to meet the demands of multimedia traffic.

BRIEF SUMMARY OF THE INVENTION

A method and system for routing traffic in a communication network is disclosed that may include assigning each node in a network a first subset of route repository nodes and a second subset of route repository nodes, querying the second subset of route repository nodes in order to obtain route information that is stored in the second subset of route repository nodes, computing route information by applying a route computation algorithm to the first subset of route repository nodes, and routing traffic in the communication network based on the route information obtained from the second subset of route repository nodes and the route information computed using the first subset of route repository nodes.

DETAILED DESCRIPTION OF THE INVENTION

Figure 1:
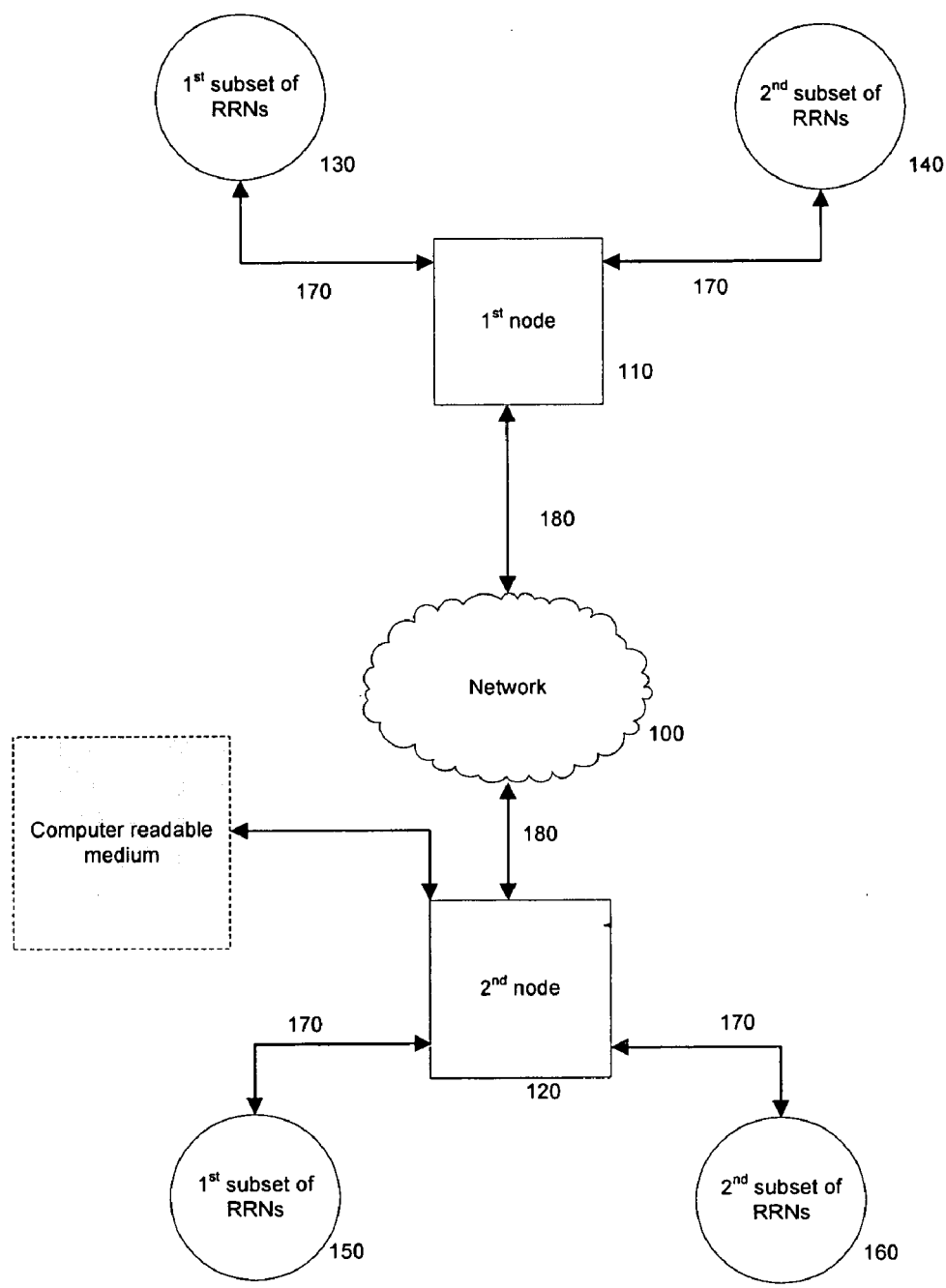
FIG. 1 is an exemplary network diagram which illustrates a possible process a method for sending an electronic communication in accordance with an embodiment of the present invention.

The invention relates to an architecture and associated protocol for efficiently performing routing by collecting route information in designated nodes, known as route repository nodes ("RRNs"), and distributing route information over designated links called routing protocol messaging links ("RPMLs"). More specifically, the invention may be directed towards mobile ad hoc networks ("MANETs") having one or more nodes that are capable of sending and receiving different types of information (e.g., UAVs, geostationary satellites, extended range terrestrial nodes). All nodes in the network may have the capability to store, process, and communication information. One or more nodes may be enhanced.

A link may be designated as an RPML based on any combination of factors including link characteristics, node characteristics of link source, node characteristics of link destination, network topology and network data traffic conditions. In general, link characteristics may include link type, bandwidth capacity, data throughput, buffer utilization, propagation latency, transmission latency, packet loss, packet error rate, bit error rate, received signal strength, received signal to noise ratio, stability, trust, detectability, interceptability and/or financial cost. Node characteristics of the link source and link destination may be derived by measuring at least one of node type, processor utilization, memory utilization, buffer utilization, power utilization, buffer latency, processing latency, data throughput, stability, trust, detectability, interceptibility financial cost, and physical vulnerability.

Nodes and links may be added or removed based on reducing the impact of routing protocol overhead. As more resources are allocated to managing the routing of data, fewer resources may be available to perform other functions. This, in order to minimize the resources needed to manage routing protocol overhead, nodes and links may be added or removed, either physically or functionally, as the amount of data being communicated changes. For example, in an otherwise flat network, one could deploy a node that is highly visible to other nodes in the network in order to enable more efficient routing. For instance, a satellite or UAV may be deployed and, if desired, designated as a RRN.

The amount of data being communicated can be gauged in a variety of ways. For example, the amount of routing protocol messages over given time intervals may be measured at a specific network location, or throughout the network as a whole.

Another method of measuring the amount of data being communicated is to evaluate the performance of one or more applications running on the network. For example, monitoring the performance of web browsing, voice calls, videoconferencing, instant messaging, or image/file transfers may indicate that performance may be degraded. Nodes and links may then be added, which allows more resources to be available to support application performance. Application performance may be measured in many different ways, and may vary according to the application. For example, the throughput and latency of a voice packet may be measured in order to gauge the performance of a voice call. Application performance may also be evaluated subjectively by human monitoring.

Each node may also be assigned a first and/or second subset of RRNs. Local node connectivity information may be communicated via a link state advertisement exclusively in the first subset of RRNs. The link state advertisements may be selectively relayed to other RRNs. The second subset of RRNs may store route information obtained by running an algorithm on the local node connectivity information advertised in the first subset of RRNs. The advertisements, queries and responses may be relayed over the RPMLs.

When a node queries an RRN for routing information, the RRN may compute a route from that node to the information packet's destination. Alternatively, the RRN may respond with information which allows the node itself to compute the route to the information packet's destination.

An exemplary system for sending and receiving routing information relating to an electronic communication is shown in FIG. 1. FIG. 1 shows multiple nodes (110, 120) in a network (100), and each of their designated first subset of RRNs (130, 150) and second subset of RRNs (140, 160). Network configuration information may be communicated exclusively by way of the RPMLs (170) linking the designated first subset of RRNs (130, 150) and second subset of RRNs (140, 160) with the network nodes (110, 120). The information packet may be routed over the RPMLs (170) and/or links not designated as RPMLs (180).

Link state advertisements may be transmitted over the RPMLs (170) by way of individual unicasts to the first subset of RRNs (130, 150). Link state advertisements, sent by way of RPMLs (170), may also be communicated through multicasts delivered to the first subset of all selected RRNs (130, 150).

In order to obtain route information, a node (110, 120) may query at least one RRN in the second subset of RRNs (140, 160). The queried RRN may also selectively relay the query from each node (110, 120) to a RRN within the second subset of RRNs (140, 160). In response to a query from a node (110, 120), the queried RRN may respond with complete or partial route information. The responding RRN may relay a response through other RRNs within the second subset of RRNs (140, 160) before the response reaches the querying node (110, 120). A RRN may also communicate routing information even when the RRN has not queried.

Route information queries may be performed through individual unicasts to the second subset of RRNs (140, 160). Route information queries may also be performed through multicast delivery to the second subset of RRNs (140, 160).

The nodes (110, 120) may assign a first subset of RRNs (130, 150) and/or second subset of RRNs (140, 160). For example, the first and second subset of each node (110, 120) may be based on node characteristics and/or network topology.

Although not shown in FIG. 1, the network 100 may be configured such that each node's (110, 120) first subset of RRNs (130, 150) may be identical or similar to its second subset of RRNs (140, 160).

The figures and the related discussion are intended to provide a brief, general description of a suitable computing environment in which the invention may be implemented. Although not required, the invention will be described, at least in part, in the general context of computer-executable instructions contained on computer readable medium 190, such as program modules, being executed by a computer which may used as one of the nodes (110, 120) shown in FIG. 1. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks may be performed by remote processing devices that may be linked through a communications network. In a distributed computing environment, program modules may be located in both local and remote memory storage devices.

An exemplary system for implementing the invention may be a node which may be or include a general purpose computing device in the form of a conventional computer (not shown), and may include a processing unit (CPU), a system memory, and a system bus that couples various system components including the system memory to the processing unit. The system bus may be any of several types of bus structures including a memory bus or memory controller, a peripheral bus, and a local bus using any of a variety of bus architectures. The system memory may include read only memory (ROM) and random access memory (RAM). A basic input/output (BIOS), containing the basic routine that helps to transfer information between elements within the computer, such as during start-up, may be stored in the ROM. The computer may further include a hard disk drive for reading from and writing to a hard disk, a magnetic disk drive for reading from or writing to removable magnetic disk, and an optical disk drive for reading from or writing to a removable optical disk such as a CD ROM or other optical media. The hard disk drive, magnetic disk drive, and optical disk drive may be connected to the system bus by a hard disk drive interface, magnetic disk drive interface, and an optical drive interface, respectively. The drives and the associated computer-readable media provide nonvolatile storage of computer readable instructions, data structures, program modules and other data for the computer.

Although the exemplary environment described herein may employ a hard disk, removable magnetic disks and removable optical disks, it should be appreciated by those skilled in the art that other types of computer readable media which can be any available media that can be accessed by a general purpose or special purpose computer to store data and carry or contain computer-executable instructions or data structures stored thereon. By way of example, and not limitation, such computer-readable media as shown in FIG. 1 can include magnetic cassettes, flash memory cards, digital video disks, Bernoulli cartridges, random access memories (RAMs) read only memory (ROM), EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Figure 2:
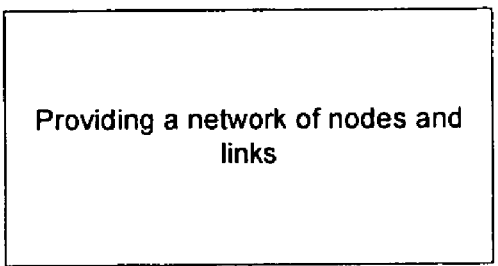
FIG. 2 is an exemplary flowchart which illustrates a possible process for sending an electronic communication in accordance with an embodiment of the present invention.
Figure 2:
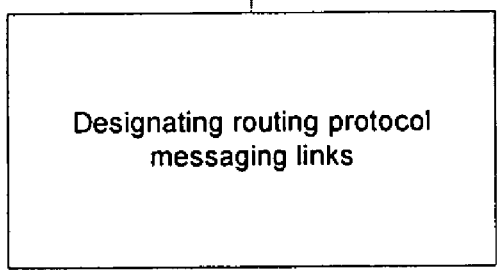
Figure 2:
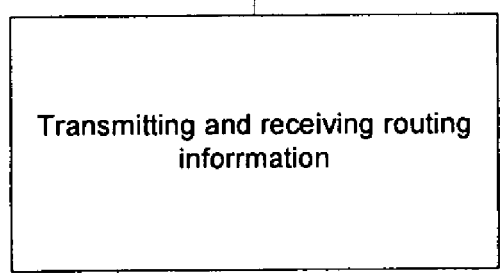

Computer readable medium 190 may be used and include computer-executable instructions as shown in FIG. 2 to include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks may be performed by local and remote processing devices that may be linked (either by hardwired links, wireless links, or by a combination thereof) through a communications network. In a distributed computing environment, program modules may be located in both local and remote memory storage devices.

FIG. 2 shows a possible process for routing traffic in a communication network (100) in accordance with the invention. The process begins at step 210 and at step 220, one or more of the plurality of network nodes (110, 120) and/or RRNs (130, 140, 150, 160) act as a route determining node and assigns each node (110, 120) in the network (100) a first subset of route repository nodes (130, 140) and a second subset of route repository nodes (150, 160). In step 230, the route determining node then queries the second subset of route repository nodes (150, 160) in order to obtain route information that is stored in the second subset of route repository nodes (150, 160). In step 240, the route determining node then computes route information by applying a route computation algorithm to the first subset of route repository nodes (130, 140). In step 250, the route determining node enables the traffic to be routed in the communication network (100) based on the route information obtained from the second subset of route repository nodes (150, 160) and the route information computed using the first subset of route repository nodes (130, 140).

Figure 3:
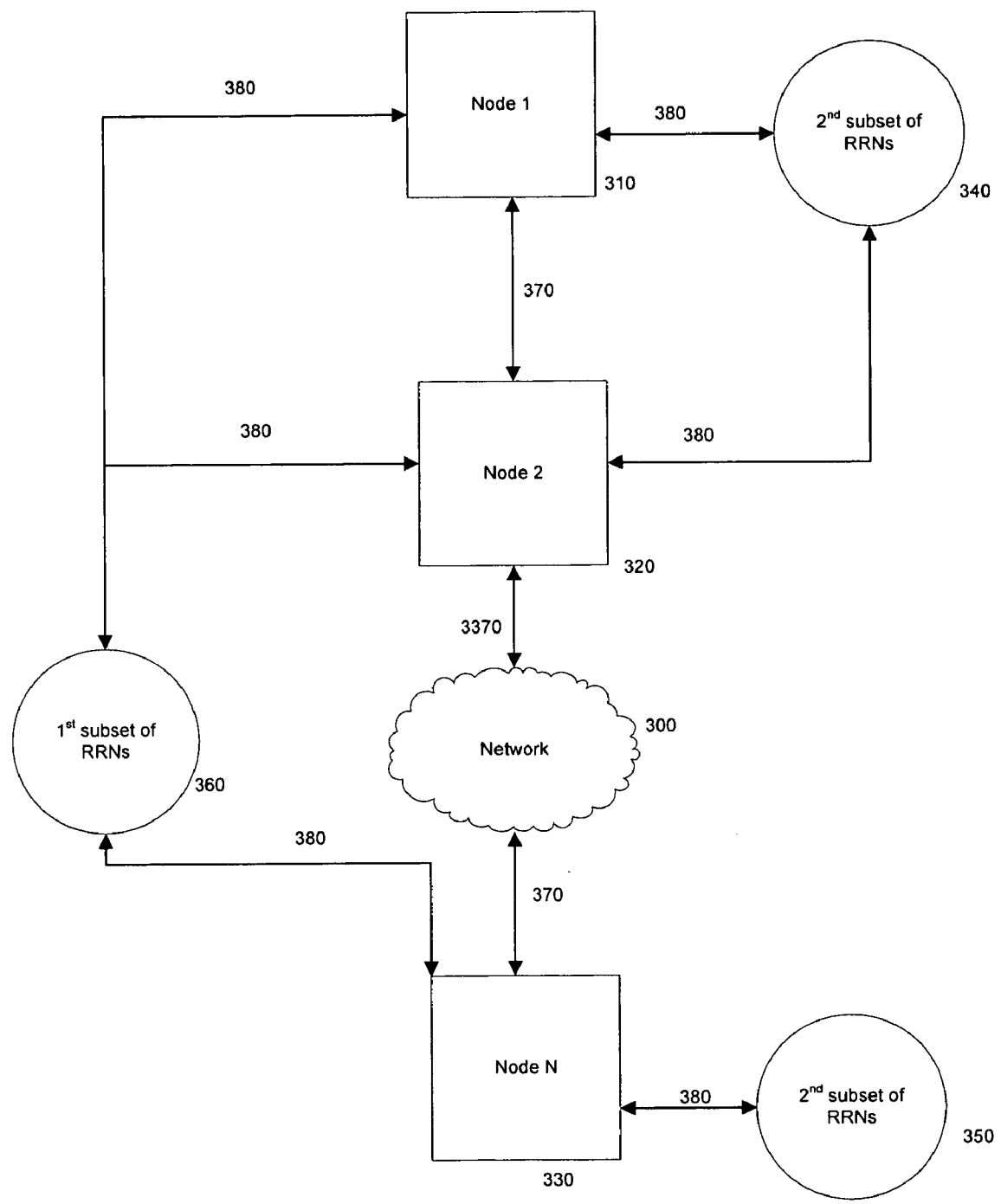
FIG. 3 is an exemplary network diagram which illustrates a possible process for sending an electronic communication in which all nodes share a common first subset of route repository nodes in accordance with an embodiment of the present invention.

As shown in FIG. 3, a network (300) in which nodes (310, 320, 330) may share a common first subset of RRNs (360). Nodes (310, 320, 330) may or may not share the same second subset of RRNs (340, 350).

Figure 4:
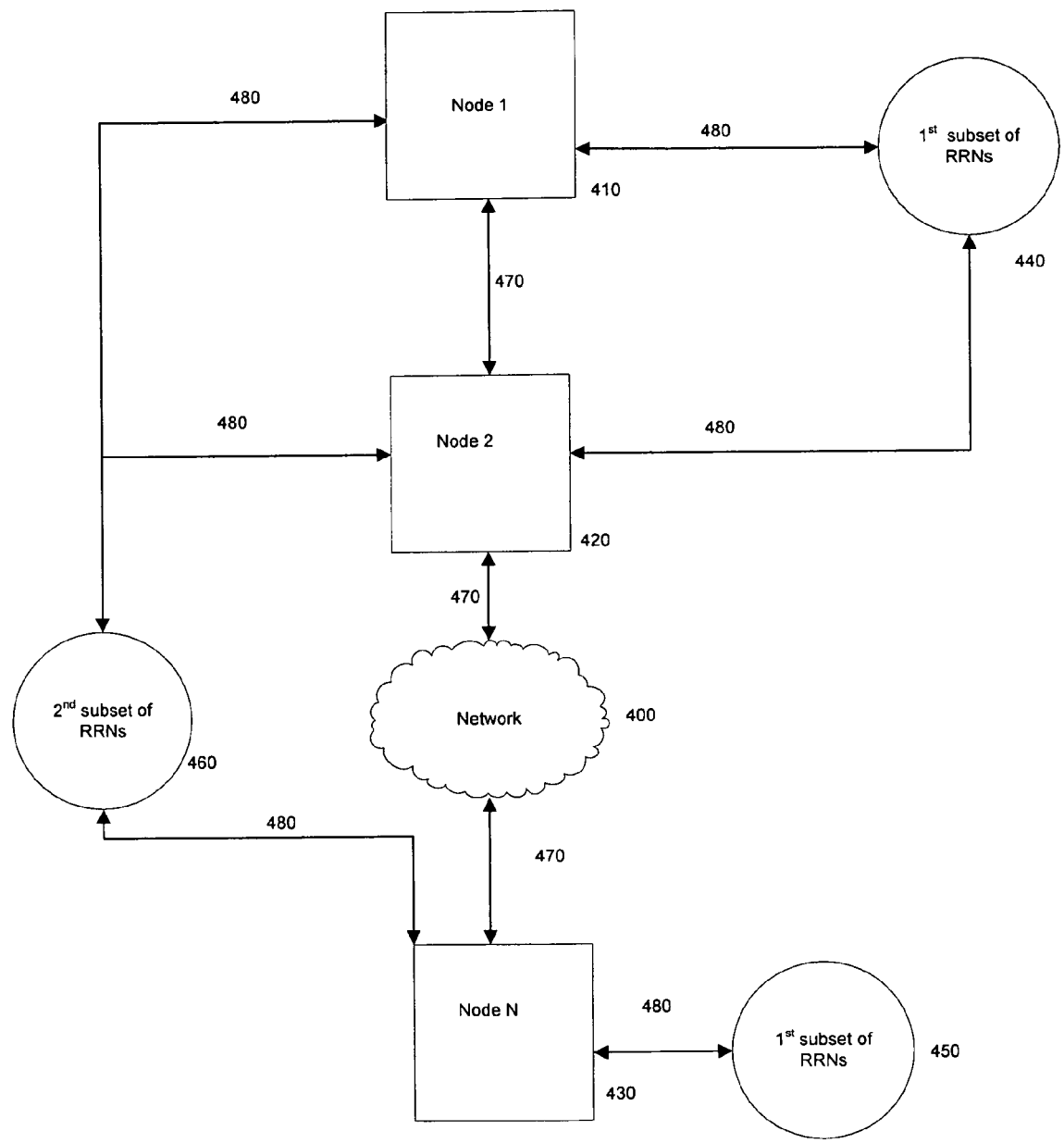
FIG. 4 is an exemplary network diagram which illustrates a possible process for sending an electronic communication in which all nodes share a common second subset of route repository nodes in accordance with an embodiment of the present invention.

As shown in FIG. 4, a network (400) in which nodes (410, 420, 430) may share a common second subset of RRNs (460) is disclosed. Nodes (410, 420, 430) may or may not share the same first subset of RRNs (440, 450).

Figure 5:
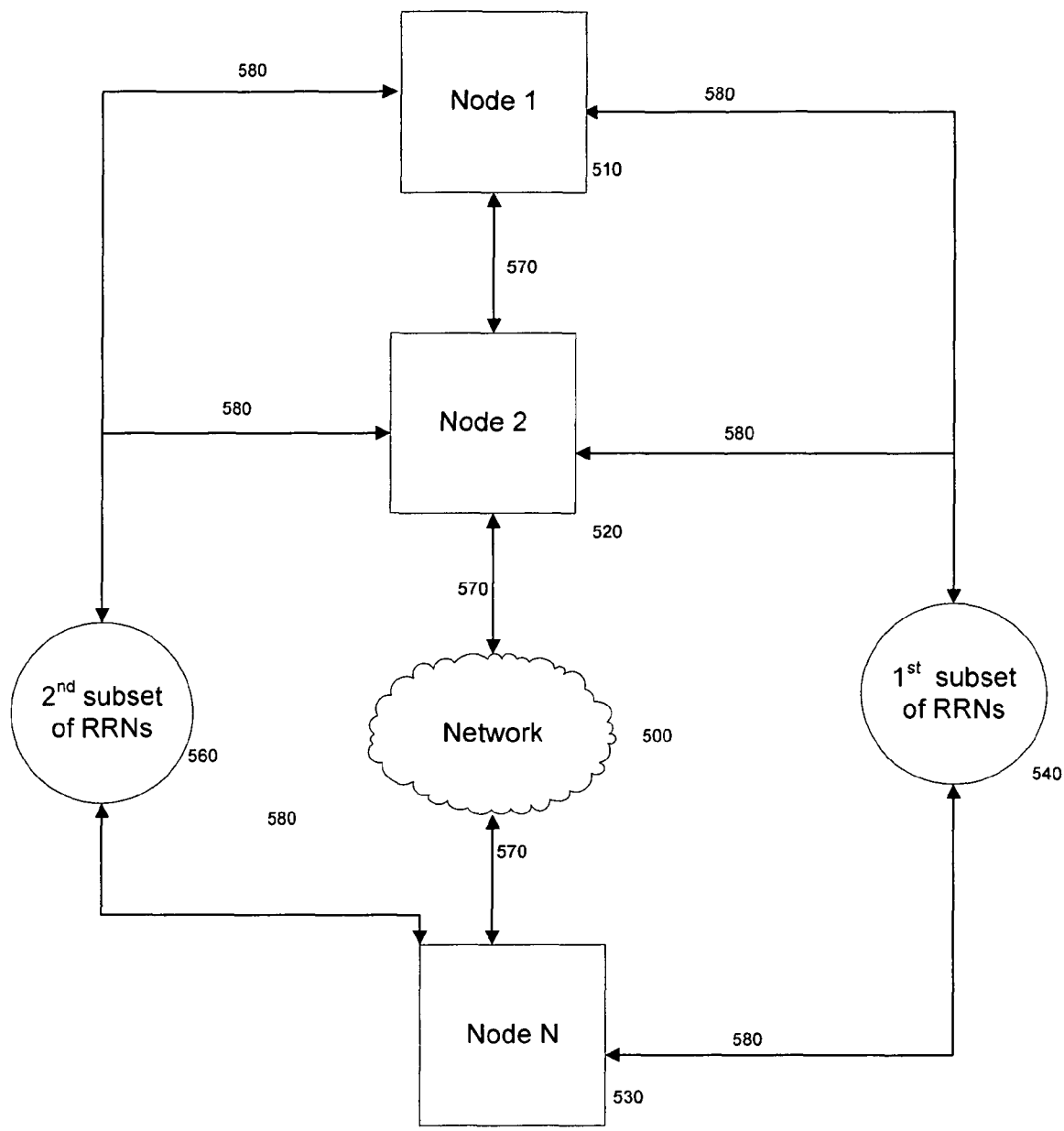
FIG. 5 is an exemplary network diagram which illustrates a possible process for sending an electronic communication in which all nodes share a common first and second subset of route repository nodes in accordance with an embodiment of the present invention.

As shown in FIG. 5, a network (500) in which nodes (510, 520, 530) may share the same first subset of RRNs (540) and the same second subset of RRNs (560) is disclosed. The first common subset RRNs (540) and/or the second common subset RRNs (560) may themselves include one or more RRNs.

Figure 6:
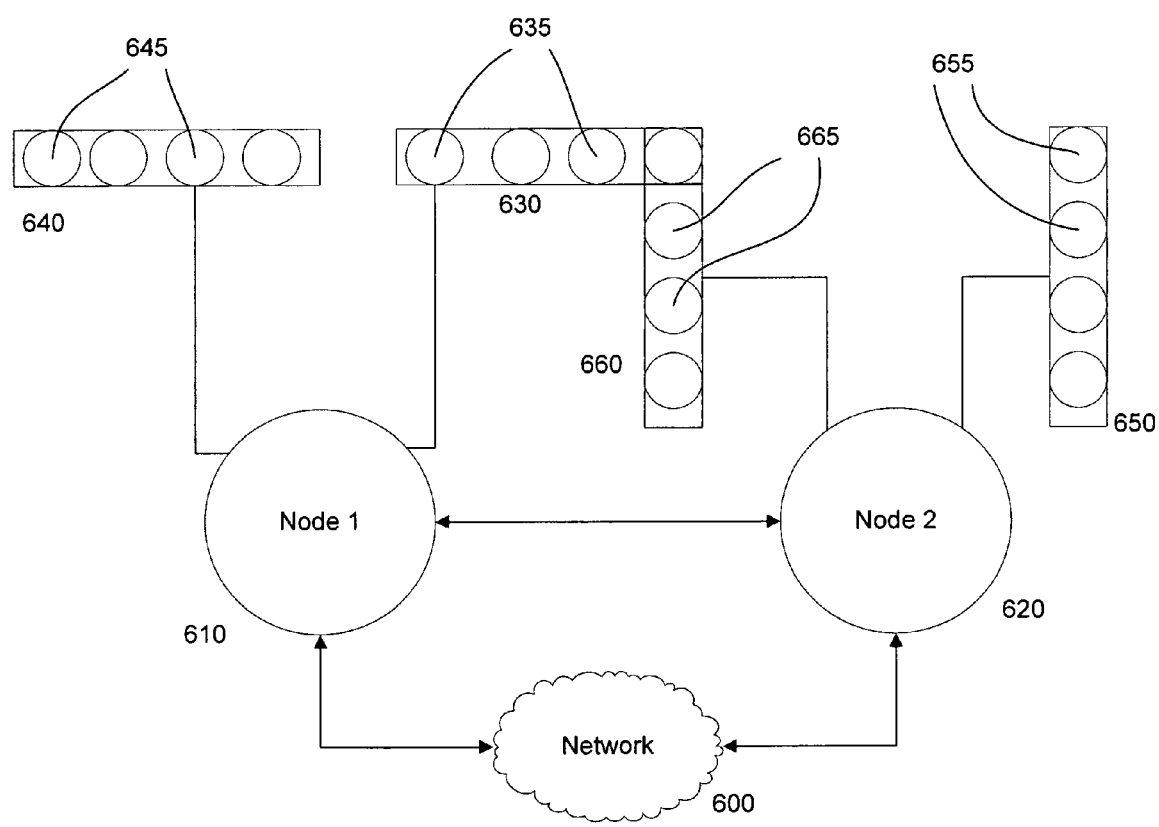
FIG. 6 is an exemplary network diagram which illustrates a possible process for sending an electronic communication in a quorum architecture in accordance with an embodiment of the present invention.

A method for routing electronic messages such that the RRN subsets may be organized into a quorum architecture is also disclosed. Each node's first subset of RRNs may intersect with any other node's second subset of RRNs by at least one RRN. As shown in FIG. 6, a first node (610) having a first subset (630) of RRNs (635), and a second subset (640) of RRNs (645). Also shown in FIG. 6 is a second node (620) having a first subset (650) of RRNs (655), and a second subset (660) of RRNs (665). The first subset (630) of RRNs (635) of the first node (610) may have at least one RRN in common with the second subset (660) of RRNs (665) of the second node (620). Each subset of any RRN may contain only one node, or more than one node.

Figure 7:
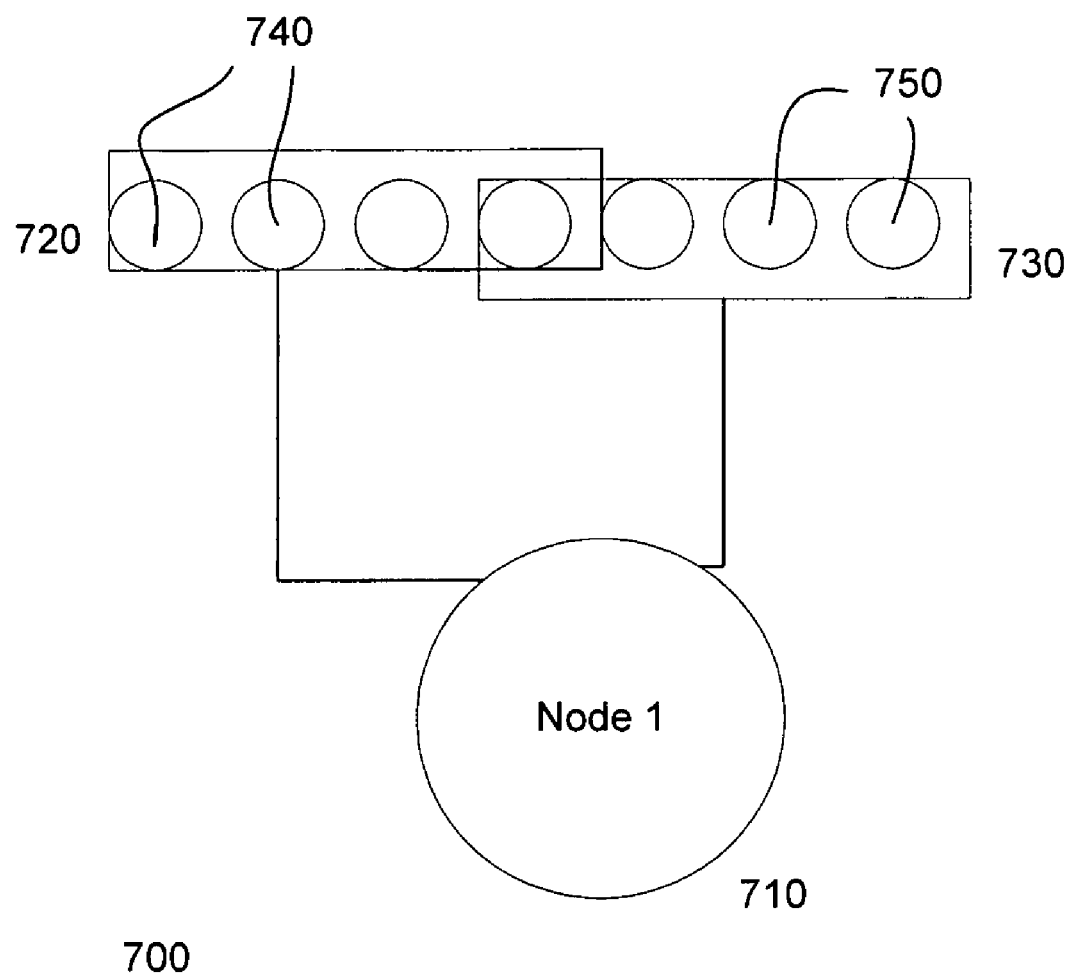
FIG. 7 is an exemplary network diagram which illustrates a possible process for sending an electronic communication in a quorum architecture in accordance with another embodiment of the present invention.

Each node may have its own subsets of RRNs organized into a quorum architecture. As shown in FIG. 7, a node's (710) first subset (720) of RRNs (740) may have at least one RRN in common with the that node's (710) second subset (730) of RRNs (750).

Figure 8:
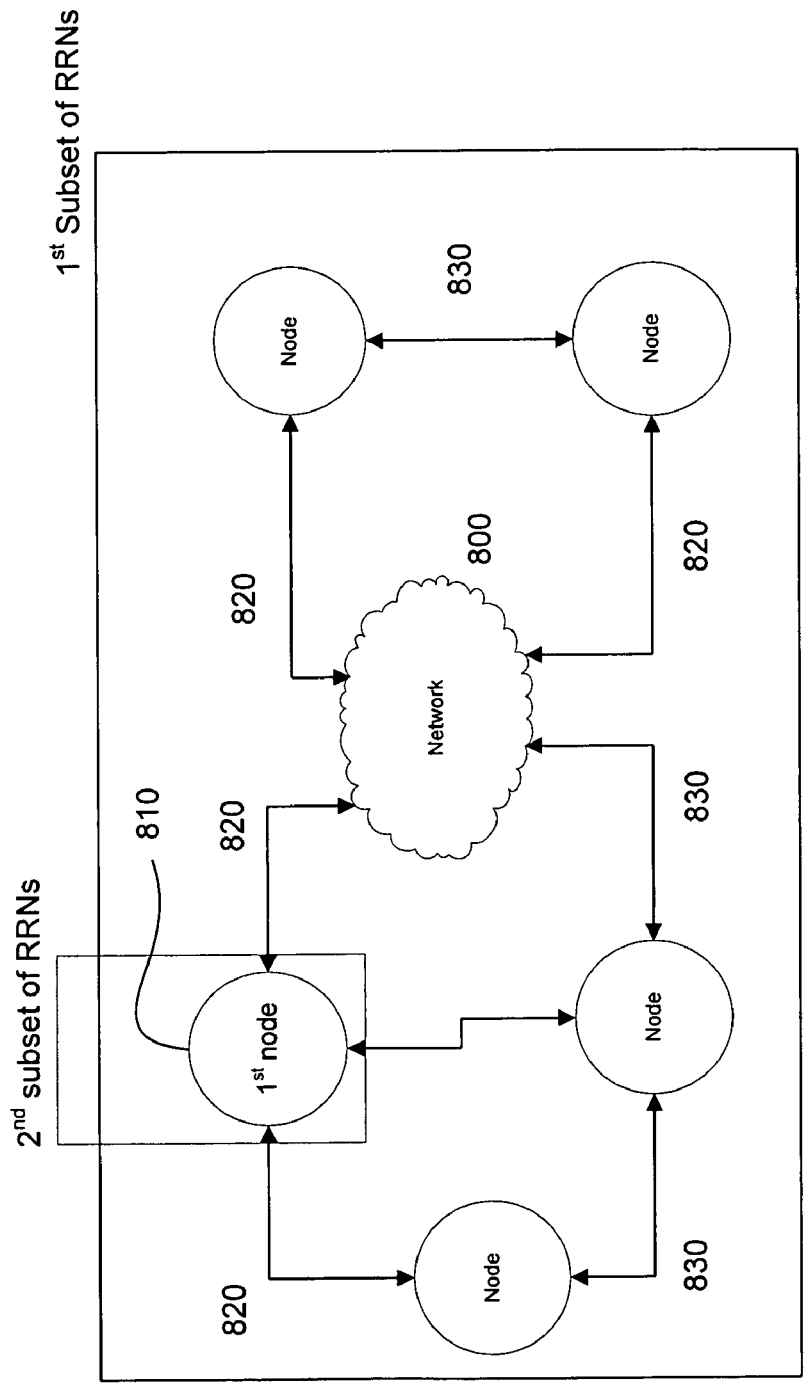
FIG. 8 is an exemplary network diagram which illustrates a possible process for sending an electronic communication with a proactive routing protocol in accordance with an embodiment of the present invention.

In FIG. 8, a method of routing electronic communication with a proactive routing protocol is disclosed. In this system (800), all nodes may be designated as RRNs, and the first subset of RRNs may include all of the nodes. As shown in FIG. 8, all nodes may be assigned into the first subset of RRNs. Links between these nodes may be RPMLs (820), or non-RPMLs (830). Each node's second subset of RRNs may include only itself. For example, the node (810) in FIG. 8 may have all nodes designated as its first subset of RRNs. The second subset of RRNs for node (810) may include only node (810) itself.

Figure 9:
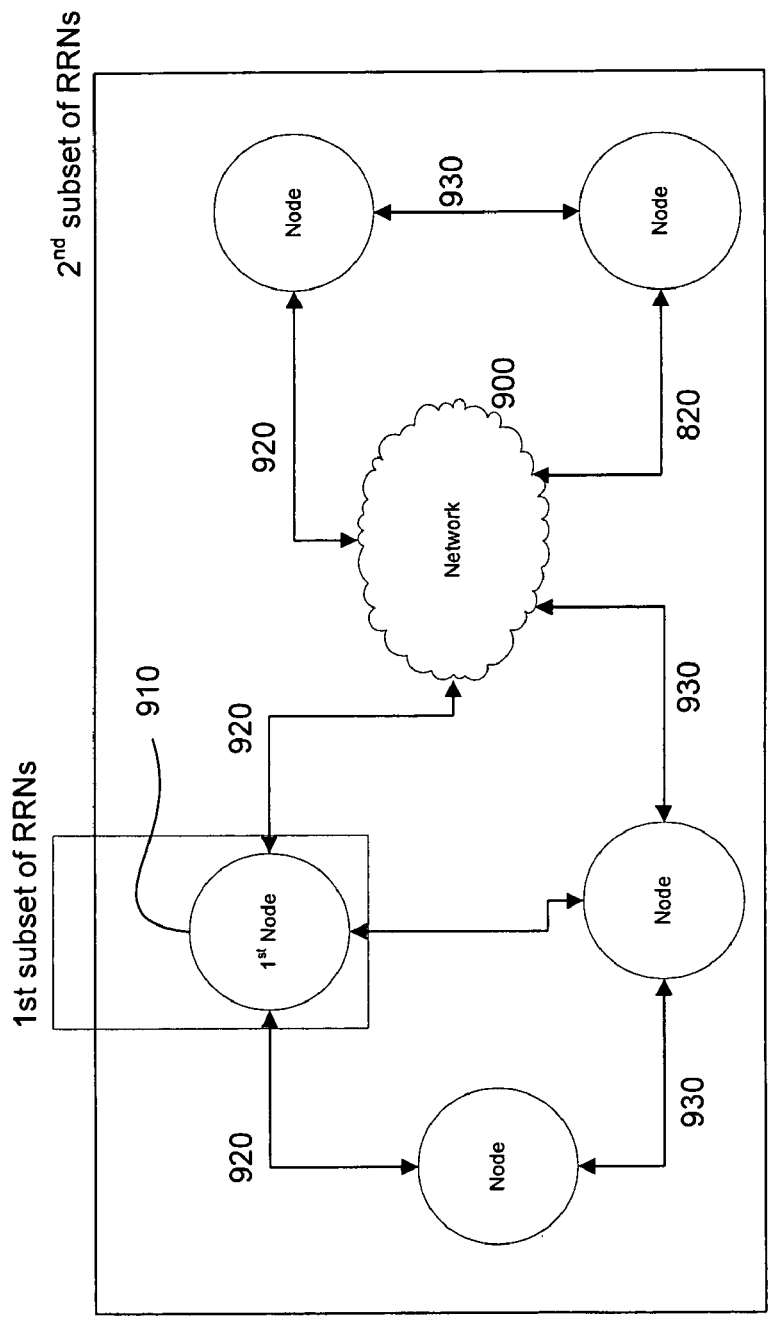
FIG. 9 is an exemplary network diagram which illustrates a possible process for sending an electronic communication with a reactive routing protocol in accordance with an embodiment of the present invention.

In FIG. 9, a method of routing electronic communication with a reactive routing protocol is disclosed. In this system (900), all nodes may be designated as RRNs, and the second subset of RRNs may include all of the nodes. As shown in FIG. 9, all nodes may be assigned into the second subset of RRNs. Links between these nodes may be RPMLs (920), or non-RPMLs (930). Each node's first subset of RRNs may include only itself. For example, the node (910) in FIG. 9 may have all nodes designated as its second subset of RRNs. The first subset of RRNs for node (910) may include only node (910) itself.

A method of routing electronic communication utilizing a RRN proxy architecture is also disclosed. In a proxy architecture, a single RRN may serve as an intermediary on behalf of a regular node. This intermediary may then communicate information between the regular node and the RRNs. For example, the first subset of RRNs of a node may comprise an advertisement proxy, wherein the advertisement proxy may comprise one RRN. The second subset of RRNs in this embodiment may comprise a query proxy RRN, wherein the query proxy RRN may comprise one RRN.

The advertisement proxy RRN may selectively relay node connectivity information to one or more RRNs. The advertisement proxy RRN may also relay node connectivity information to all other RRNs.

The query proxy RRN may selectively relay queries to one or more RRN, and relay received responses to the querying node, as well as to other nodes. The query proxy RRN may also relay queries to all RRNs and relay responses back to the querying node, as well as to other nodes.

A method of routing electronic communications in which nodes may advertise node connectivity information to each RRN in its first subset of RRNs at an advertisement rate associated with that particular node to RRN pairing is also disclosed. For example, one RRN in each node's first subset of RRNs may be designated as a primary RRN and may be updated with node connectivity information at a first advertisement rate. At least one additional RRN in each node's first subset of RRNs may be designated as a standby RRN and may be updated with node connectivity information at a second advertisement rate that may be less than the first advertisement rate.

A method for routing electronic communications in which a RRN that issues a reply to a node's route information query may issue one or more subsequent replies comprising updated route information. The subsequent reply, or replies, may be sent periodically, and/or in response to a change in route information exceeding a specified threshold. A subsequent reply, or replies, may also be sent in response to a follow-up query. The route information queries may comprise, for example, information relating to the destinations for which a route may be requested, the duration for which a route may be requested, and/or the performance specifications for the requested route.

In another embodiment, route assignments may be determined exclusively by RRN route information responses. Route information provided through an RRN route information response may be valid for a specified duration, after which a new RRN response may be required. Route information responses may comprise route information relating to zero routes or more.

Route information may include, for example, explicit route specifications, next hop forwarding instructions, rules for selecting between routes, and/or route performance metrics. RRNs may indicate a response of "no route" by sending, for example, a route information response containing no routes, sending a route information response containing a specified code indicating "no route," and/or withholding a route information response.

A method of determining and reporting node health is also disclosed. Node health may be derived from, for example, node activity state, node connectivity, a remaining life metric, processor utilization, memory utilization, and/or a RRN willingness metric. Node health may also be determined through health notification. Health notification comprises, for example, explicit health notification advertisements, explicit health notification responses to health queries, and implicit health notification based on other received messages. A node failure may be based on the absence of health notification within a specified interval. Node health may be included in the periodic route advertisements sent to RRNs. A node may advertise its node health to other nodes at a rate less than its node connectivity information advertisement rates to associated RRNs.

A method of dynamic RRN configuration is also disclosed. Dynamic RRN configuration may be based on the evaluation of node connectivity, the evaluation of network topology, the evaluation of node characteristics, the evaluation of node health, and/or the detection of node failure. Dynamic RRN configuration may comprise RRN assignment changes, RPML assignment changes, RRN state migration, update of messaging parameters, and/or no operation at all. Associated nodes may be informed about RRN assignments through periodic RRN assignment notification, triggered notification of RRN assignments, and/or querying of nodes for their RRN assignment.

Each node may autonomously perform dynamic RRN configuration based on locally available information. Dynamic RRN configuration may be based on a distributed decision algorithm and messaging protocol. A standby RRN may assume the role of a primary RRN, and its route advertisement rates may be increased accordingly.

In another embodiment, a single, common, highly connected RRN may serve all network nodes. The RRN may comprise, for example, any combination of a satellite, a UAV, a manned aerial vehicle, and/or a highly connected terrestrial node.

Each node may share a common first subset of RRNs, comprising a plurality of nodes distributed throughout the network. The second subset of RRNs may comprise one node in that common first subset of RRNs. The membership of all RRN subsets may be determined based on any combination of optimizing network performance and minimizing routing protocol traffic.

The common first subset of RRNs may comprise a plurality of aerial vehicles. The common first subset of RRNs may also comprise any combination of aerial vehicles and satellites. Each node may select an aerial vehicle and/or a satellite of the common first subset of RRNs to be its advertisement proxy RRN. The proxy selection may be based on optimizing network performance, and/or minimizing routing protocol traffic. Each node's advertisement proxy RRN may relay node connectivity information to other RRNs in the common first subset of RRNs.

In another embodiment, each node may share a common subset of RRNs comprising a plurality of nodes distributed throughout the network. Each node's first subset of RRNs may comprise one node in the common second subset of RRNs. The membership of all RRN subsets may be based on optimizing network performance and/or minimizing routing protocol traffic.

The common second subset of RRNs may include a plurality of aerial vehicles. The common second subset of RRNs may also comprise an aerial vehicle and/or a satellite. Each node may select an aerial vehicle and/or a satellite of the common second subset of RRNs to be its query proxy RRN. The proxy selection may be based on optimizing network performance and/or minimizing routing protocol traffic. Each node's query proxy RRN may relay queries to all other RRNs in the common second subset of RRNs, and may relay received responses to the querying node.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

What is claimed is:

1. A method for routing traffic in a communication network comprising:
    assigning each node in a network a first subset of route repository nodes and a second subset of route repository nodes;
    storing local connectivity information in the first subset of route repository nodes;
    computing route information by applying a route computation algorithm to the first subset of route repository nodes;

storing the route information in the second subset of route repository nodes;

querying the second subset of route repository nodes in order to obtain the route information;

enabling traffic through each node to be routed based on the route information obtained from the second subset of route repository nodes; and establishing a dynamic route repository node configuration based on at least one dynamic route repository node evaluation factor, the dynamic route repository node configuration characterized by one of route repository node assignment changes, proxy route repository node assignment changes, routing protocol messaging link assignment changes, route repository node state migration, and updating of messaging parameters, and the dynamic route repository node evaluation factors being one of node connectivity, network topology, node characteristics, node health, and node failure;

wherein the dynamic route repository node configuration permits nodes to be informed concerning route repository node assignments through one of periodic route repository node assignment notifications, triggered notification of route repository node assignments, and querying of nodes for their route repository node assignments.

2. The method of claim 1, further comprising:

advertising route information to route repository nodes, wherein the route advertisements are issued through at least one of individual unicasts to individual route repository nodes or through multicast delivery to all selected route repository nodes.

3. The method of claim 1, further comprising:

establishing a quorum architecture, wherein each node's first subset of route repository nodes has at least one route repository node in common with each node's second subset of route repository nodes.

4. The method of claim 1, further comprising:

establishing a proxy architecture, wherein each node's first subset to route repository nodes comprises one advertising route repository node and each node's second subset to route repository nodes comprises one query proxy route repository node.

5. The method of claim 1, wherein at least one highly-connected route repository node serves all network nodes, the at least one highly connected route repository node being one of a satellite, an unmanned aerial vehicle, a manned aerial vehicle, and a terrestrial node.

6. A non-transitory computer readable medium encoded with computer readable instructions executed by at least one processor to implement a method for routing traffic in a communication network comprising:

assigning each node in a network a first subset of route repository nodes and a second subset of route repository nodes;

storing local connectivity information in the first subset of route repository nodes;

computing route information by applying a route computation algorithm to the first subset of route repository nodes;

storing the route information in the second subset of route repository nodes;

querying the second subset of route repository nodes in order to obtain the route information;

enabling traffic through each node to be routed based on the route information obtained from the second subset of route repository nodes; and establishing a dynamic route repository node configuration based on at least one dynamic route repository node evaluation factor, the dynamic route repository node configuration characterized by one of route repository node assignment changes, proxy route repository node assignment changes, routing protocol messaging link assignment changes, route repository node state migration, and updating of messaging parameters, and the dynamic route repository node evaluation factors being one of node connectivity, network topology, node characteristics, node health, and node failure;

wherein the dynamic route repository node configuration permits nodes to be informed concerning route repository node assignments through one of periodic route repository node assignment notifications, triggered notification of route repository node assignments, and querying of nodes for their route repository node assignments.

7. The non-transitory computer readable medium of claim 6, further comprising:

advertising route information to route repository nodes, wherein the route advertisements are issued through at least one of individual unicasts to individual route repository nodes or through multicast delivery to all selected route repository nodes.

8. The non-transitory computer readable medium of claim 6, further comprising:

establishing a quorum architecture, wherein each node's first subset of route repository nodes has at least one route repository node in common with each node's second subset of route repository nodes.

9. The non-transitory computer readable medium of claim 6, further comprising:

establishing a proxy architecture, wherein each node's first subset to route repository nodes comprises one advertising route repository node and each node's second subset to route repository nodes comprises one query proxy route repository node.

10. The non-transitory computer readable medium of claim 6, wherein at least one highly-connected route repository node serves all network nodes, the at least one highly connected route repository node being one of a satellite, an unmanned aerial vehicle, a manned aerial vehicle, and a terrestrial node.

11. A system routing traffic in a communication network, comprising:

a plurality of nodes; and a route determination node, wherein the route determination node assigns each node in the network a first subset of route repository nodes and a second subset of route repository nodes, stores local connectivity information in the first subset of route repository nodes, computes route information by applying a route computation algorithm to the first subset of route repository nodes, stores the route information in the second subset of route repository nodes, queries the second subset of route repository nodes in order to obtain the route information wherein traffic is routed through each node based on the route information obtained from the second subset of route repository nodes;

wherein the route determination node establishes a dynamic route repository node configuration based on at least one dynamic route repository node evaluation factor, the dynamic route repository node configuration characterized by one of route repository node assignment changes, proxy route repository node assignment changes, routing protocol messaging link assignment changes, route repository node state migration, and updating of messaging parameters, and the dynamic route repository node evaluation factors being one of node connectivity, network topology, node characteristics, node health, and node failure;

wherein the dynamic route repository node configuration permits nodes to be informed concerning route repository node assignments through one of periodic route repository node assignment notifications, triggered notification of route repository node assignments, and querying of nodes for their route repository node assignments.

12. The system of claim 11, wherein the route determination node causes route information advertisements to be issued to route repository nodes, wherein the route advertisements are issued through at least one of individual unicasts to individual route repository nodes or through multicast delivery to all selected route repository nodes.

13. The system of claim 11, wherein the route determination node establishes a quorum architecture, wherein each node's first subset of route repository nodes has at least one route repository node in common with each node's second subset of route repository nodes.

14. The system of claim 11, wherein the route determination node establishes a proxy architecture, wherein each node's first subset to route repository nodes comprises one advertising route repository node and each node's second subset to route repository nodes comprises one query proxy route repository node.

15. The system of claim 11, further comprising:

at least one highly-connected route repository node that serves all network nodes, the at least one highly connected route repository node being one of a satellite, an unmanned aerial vehicle, a manned aerial vehicle, and a terrestrial node.

* * * * *